Aug. 9, 1927.
H. V. RAU
RIVET
Filed July 16, 1924
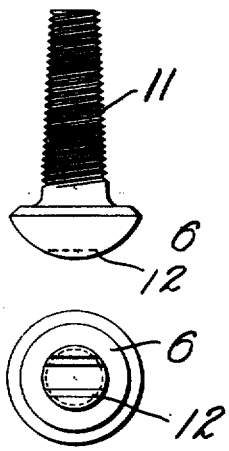
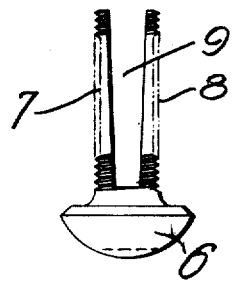
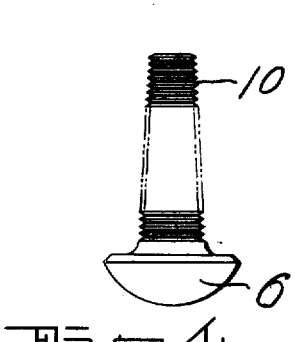
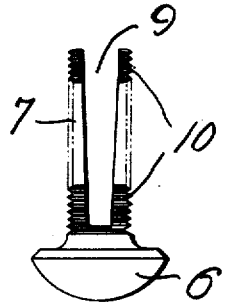

Patented Aug. 9, 1927.

1,638,165

UNITED STATES PATENT OFFICE.

HENRY V. RAU, OF BROOKLYN, NEW YORK, ASSIGNOR TO EDWARD B. STIMPSON COMPANY, OF BROOKLYN, NEW YORK.

RIVET.

Application filed July 16, 1924. Serial No. 726,258.

The invention relates to improvements in rivets of the bifurcated type. One of the objects of the invention is to provide a rivet of this kind which will have excellent penetrative qualities, and which, when clinched, will securely hold itself in position with respect to the material through which it has been driven. To that end I have designed a bifurcated rivet with legs of progressively increasing cross-sectional area from the ends of the legs towards the head, and with surface interruptions on the outer faces of the legs. Preferably the shank of the rivet is initially a cylinder, circular in cross-section, and the prongs are formed by cutting a slot in the shank, of progressively decreasing width from the outer end of the cylinder towards the rivet head. The surface interruptions on the outer faces of the prongs may be formed either before or after the slotting, and may be of various kinds, as hereinafter set forth.

In a further developed form of the invention the prongs are externally threaded, so that the rivet may function as such, or may, if desired, be used as a screw in connection with a tapped socket or the like, with advantages due to structure and methods of manufacture which will be explained hereinafter.

Other objects and aims of the invention, more or less broad than those stated above, together with the advantages inherent, will be in part obvious and in part specifically referred to in the course of the following description of the elements, combinations, arrangements of parts, and applications of principles constituting the invention; and the scope of protection contemplated will appear from the claims.

In the accompanying drawings, which are to be taken as part of this specification, and in which I have shown merely a preferred form of embodiment of the invention.

Figure 1 is an elevation of a pronged rivet embodying my invention;

Figure 2 is a similar view of the same, as turned on its axis through an arc of 90°;

Figure 3 is an end view of the same, looking at the ends of the prongs; and

Figures 4 and 5 are views, similar to Figures 1 and 2, respectively, illustrating a modified form of the device.

Referring to the numerals on the drawings, the head of a rivet is indicated at 6, and it may be of any usual or preferred type. The shank that extends away from the head is preferably initially a cylinder, circular in cross-section, and the shank is divided into prongs 7, 8, by cutting a diametrical slot from the outer end of the cylinder towards the head, widest at the outer end, and of progressively decreasing width towards the head. The effect of this operation is to form prongs that are of progressively increasing cross-sectional area from their outer ends towards the rivet-head, and with the outer faces of the prongs defined by longitudinal lines substantially parallel to the axis of the rivet, except as the legs may be slightly spread apart in the slotting operation. Either before or after the slotting operation I form surface interruptions externally of the prongs. For manufacturing reasons I prefer that this operation shall be performed on the solid shank, before the slotting. The surface interruptions may be merely parallel transverse grooves 10, as indicated in Figures 4 and 5, or sections of a thread 11, as in Figures 1 and 2.

A rivet fashioned as above will readily penetrate materials with which it is designed to be used, without buckling, because of the small cross-section of the prongs at their outer ends, and the progressive increase in cross-section towards the head. And because the inner faces of the prongs converge towards the head, there is no tendency for the prongs to close towards each other as the rivet is driven. When, however, the rivet is clinched, the outer faces of the prongs, because of their surface interruptions, make a firm frictional hold, or interlock, with the material into which the rivet has been driven. Where the surface interruptions have been formed by a thread 11, the shank can be entered into a tapped socket or the like, the rivet functioning as a screw. To that end the head 6 may be kerfed, as indicated at 12, like the head of a screw. When the article is used as a screw I find that it is advisable, before entering it into the screw-hole, to spread the prongs apart slightly; this is not always necessary, because ordinarily the prongs are left in a slightly spread condition by the slotting operation. In many situations it is found that the device serves very well, holding itself in position against backing out due to vibration, etc. This is because of the slight spread of the prongs and the tendency of the prong ends to resume the spread condition from which they have been forced by the compression to which they have been subjected in entering them into, and in which they are held by the walls of the screw-hole. Furthermore, the fact that the shank is bifurcated, and not solid, helps to keep it in place, because in case of any slight movement due to vibration or the like, some part of one or more of the four prong edges will come into arresting contact with the screw-hole wall. In cases where the tapped hole runs all the way through a thickness of material, for instance, and the ends of the prongs extend beyond the face of the material, the prongs may be decidedly bent, even to the extent of forcing their outer faces against the material, and so hold the rivet-screw positively against rotation and withdrawal.

I claim:

1. A rivet having a bifurcated shank, the prongs of which are of progressively increasing cross-section in the direction away from their ends and separated by a diametrical slot of decreasing width in the direction away from the prong ends, the external surface of said rivet substantially maintaining its original cylindrical shape and the prongs having external surface interruptions.

2. A rivet having a bifurcated shank, the prongs of which are of progressively increasing cross-section in the direction away from their ends and separated by a diametrical slot of decreasing width in the direction away from the prong ends, the external surface of said rivet substantially maintaining its original cylindrical shape, and the prongs having external surface interruptions in the form of a mutilated thread.

3. A rivet having a bifurcated shank, the prongs of which are of progressively increasing cross-section in the direction away from their ends and separated by a diametrical slot of decreasing width in the direction away from the prong ends, the external surface of said rivet substantially maintaining its original cylindrical shape, the prongs having external surface interruptions in the form of a mutilated thread, the rivet having a kerfed head.

In testimony whereof I affix my signature.

HENRY V. RAU.

spread of the prongs and the tendency of the prong ends to resume the spread condition from which they have been forced by the compression to which they have been subjected in entering them into, and in which they are held by the walls of the screw-hole. Furthermore, the fact that the shank is bifurcated, and not solid, helps to keep it in place, because in case of any slight movement due to vibration or the like, some part of one or more of the four prong edges will come into arresting contact with the screw-hole wall. In cases where the tapped hole runs all the way through a thickness of material, for instance, and the ends of the prongs extend beyond the face of the material, the prongs may be decidedly bent, even to the extent of forcing their outer faces against the material, and so hold the rivet-screw positively against rotation and withdrawal.

I claim:

1. A rivet having a bifurcated shank, the prongs of which are of progressively increasing cross-section in the direction away from their ends and separated by a diametrical slot of decreasing width in the direction away from the prong ends, the external surface of said rivet substantially maintaining its original cylindrical shape and the prongs having external surface interruptions.

2. A rivet having a bifurcated shank, the prongs of which are of progressively increasing cross-section in the direction away from their ends and separated by a diametrical slot of decreasing width in the direction away from the prong ends, the external surface of said rivet substantially maintaining its original cylindrical shape, and the prongs having external surface interruptions in the form of a mutilated thread.

3. A rivet having a bifurcated shank, the prongs of which are of progressively increasing cross-section in the direction away from their ends and separated by a diametrical slot of decreasing width in the direction away from the prong ends, the external surface of said rivet substantially maintaining its original cylindrical shape, the prongs having external surface interruptions in the form of a mutilated thread, the rivet having a kerfed head.

In testimony whereof I affix my signature.

HENRY V. RAU.

CERTIFICATE OF CORRECTION.

Patent No. 1,638,165.

Granted August 9, 1927, to

HENRY V. RAU.

It is hereby certified that the name of the assignee in the above numbered patent was erroneously written and printed "Edward B. Stimpson Company," whereas said name should have been written and printed as "Edwin B. Stimpson Company", as shown by the records of assignments in this office; and that the said Letters Patent should be read with this correction therein that the same may conform to the record of the case in the Patent Office.

Signed and sealed this 4th day of October, A. D. 1927.

Seal.

M. J. Moore,
Acting Commissioner of Patents.

CERTIFICATE OF CORRECTION.

Patent No. 1,638,165.             Granted August 9, 1927, to

HENRY V. RAU.

It is hereby certified that the name of the assignee in the above numbered patent was erroneously written and printed "Edward B. Stimpson Company," whereas said name should have been written and printed as "Edwin B. Stimpson Company", as shown by the records of assignments in this office; and that the said Letters Patent should be read with this correction therein that the same may conform to the record of the case in the Patent Office.

Signed and sealed this 4th day of October, A. D. 1927.

Seal.                                         M. J. Moore,
                                       Acting Commissioner of Patents.